March 8, 1960
D. R. SAND
2,927,671
SPRAG CLUTCH
Filed Jan. 16, 1956
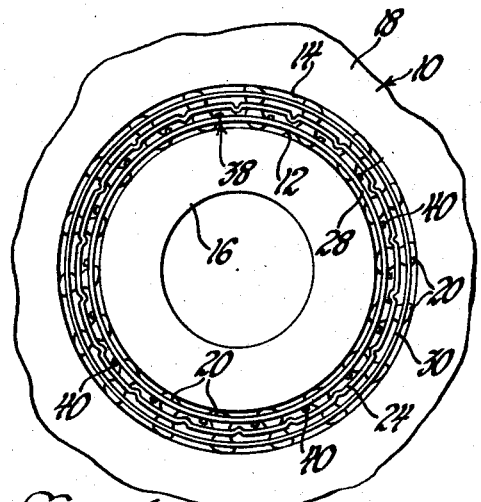
Fig. 1
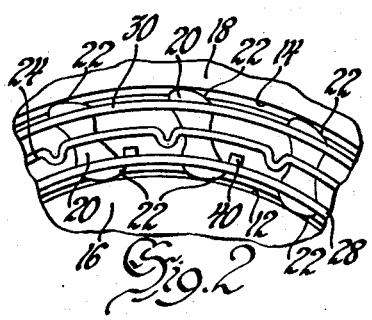
Fig. 2
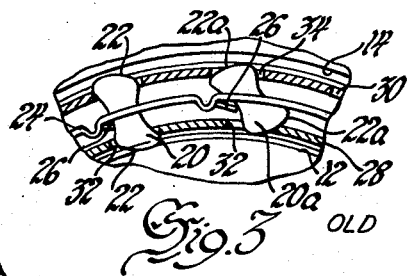
Fig. 3 OLD
Fig. 6
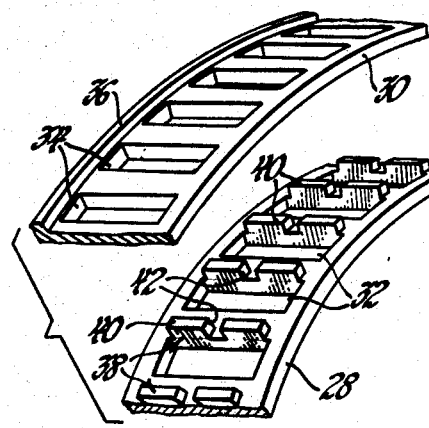
Fig. 7
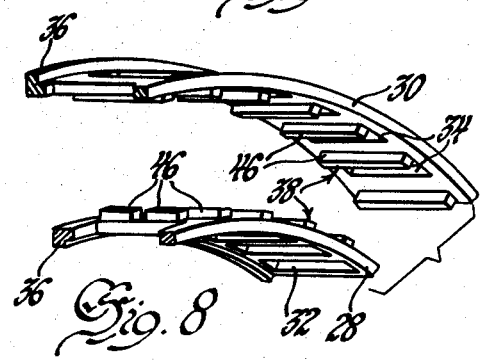
Fig. 8
INVENTOR.
Darrel R. Sand
BY
L. D. Burek
ATTORNEY United States Patent Office 2,927,671
Patented Mar. 8, 1960

2,927,671

SPRAG CLUTCH

Darrel R. Sand, Plymouth, Mich., assignor to General Motors Corporation, Detroit, Mich., a corporation of Delaware Application January 16, 1956, Serial No. 559,456

3 Claims. (Cl. 192—45.1)

The present invention relates to one-way clutches and more particularly to sprag clutches.

A sprag clutch normally employs a plurality of so-called sprags or wedge members which are angularly disposed between a pair of concentric races. When these races are rotating in one direction the ends of these sprags will merely slide on the races. However, when the races are rotating in the opposite direction, the sprags will wedge between the two races and cause one race to be driven by the other race. In order to insure proper operation of the clutch it is essential that all of the sprags are wedged between the races and each carries its proportionate share of the load. Thus it is the common practice to provide biasing means such as a spring and/or cage to retain the sprags in engagement with the races. Where the clutch is to be employed for high speed, heavy duty use, it is advantageous to employ inner and outer cages that are rotatable relative to each other. In such an installation movement of one sprag into or out of driving engagement will cause relative movement of the two cages and simultaneously force the opposite ends of all of the sprags into or out of driving engagement with the races, thereby insuring a proper loading of all of the sprags. Both of these cages have windows therein that allow the ends of the sprags to project therethrough. Although such a clutch normally operates very satisfactorily, under some conditions as relative rotation of the races changes to a driving direction and the working surfaces on the sprags engage the race surfaces, there is a tendency for the sprags to initially slide on the race surfaces before becoming properly wedged between the races. This may result in the sprag "hopping" along the race surfaces. This "hopping" action may become so violent that the sprag will "hop" completely off of the races and become wedged between the two cages and force them in circumferentially opposite directions. Such relative movement of the cages will cause the remaining sprags to be moved completely out of engagement with the races and result in the clutch becoming locked in a nondriving position so that the races are free to overrun in both directions.

It is now proposed to provide a one-way sprag clutch having cage means for biasing the sprags into driving engagement with the races and which are constructed to make it impossible for any of the sprags to become wedged between the two cages and thereby impair the operation of the clutch. More particularly, this is to be accomplished by providing a pair of relatively rotatable cages with one or both cages having enlargements such as radial shoulders adjacent the edges of the openings through which the ends of the sprags project. These shoulders will not impair the normal or desired action of the sprags, but they will decrease the size of the space between the two cages where the sprags previously became wedged to less than the size of the sprag. As a result it will be virtually impossible for any of the sprags to become wedged therebetween.

In the single sheet of drawings:

Figure 1 is an end view of a sprag clutch embodying one form of the invention.

Figure 2 is an enlarged fragmentary view of a portion of the clutch in Figure 1.

Figure 3 is a fragmentary view similar to Figure 2 showing a prior double cage clutch with one of the sprags wedged between the cages to prevent the proper operation thereof.

Figure 4 is a fragmentary view similar to Figure 2 but showing a slightly different embodiment of the invention.

Figure 5 is a fragmentary view similar to Figure 2 showing another embodiment of the present invention.

Figure 6 is a fragmentary view similar to Figure 2 showing still another view of the present invention.

Figure 7 is an exploded fragmentary perspective view of portions of the inner and outer cages of the embodiment shown in Figures 1 and 2.

Figure 8 is an exploded fragmentary perspective view of the inner and outer cages employed in the embodiment of Figure 6.

Referring to the drawings in more detail the present invention may be adapted for use in any suitable one-way clutch such as the sprag clutch 10 shown in Figure 1. This clutch 10 is adapted to be disposed between inner and outer races 12 and 14 formed on a pair of relatively rotatable members 16 and 18 having smooth, cylindrical surfaces concentric with each other and with the axis of rotation. This clutch 10 includes a plurality of wedge members or sprags 20 which are prismatic members having curved working surfaces 22 on the ends thereof in sliding engagement with the races 12 and 14. The diagonals of these members 20 are greater in one direction than in the other direction. Thus when the outer race 14 rotates counterclockwise relative to the inner race 12, the sprags 20 will merely slide on the races 12 and 14, but when the races 12 and 14 rotate in the opposite direction, the sprags 20 will rotate with the larger diagonal becoming wedged between the two races.

To insure reliable operation of the clutch 10 the sprags 20 may be biased by any suitable means to retain the working surfaces 22 against the races 12 and 14. The biasing means may include any suitable spring such as a ribbon spring 24 having openings therethrough for the sprags 20 to fit into and resilient fingers 26 that project into the openings and engage the middles of the sprags 20 and rotate them against the races 12 and 14. Even though all of the sprags 20 are in engagement with the races 12 and 14 at the time the relative rotation reverses, as a result of dimensional variations and other uncontrollable factors, there will be a tendency for a relatively small number of the sprags 20 to become wedged in position before the others. Therefore, in order to operate all of the sprags 20 in unison, relatively rotatable inner and outer cages 28 and 30 may be provided. The cages are relatively thin. Each of these cages 28 and 30 includes a plurality of circumferentially spaced windows 32 and 34 registering with the windows in the other cage and allowing the ends of the sprags 20 to project therethrough for engagement with the races 12 and 14. These windows 32 and 34 provide a very little clearance between their edges and the sprags 20. Thus as the cages 28 and 30 rotate relative to each other they will force all of the sprags 20 to operate in unison with each other. As stated before the springs 24 and cages 28 and 30 will hold the ends of the sprags 20 against the races 12 and 14, but when the outer race 14 rotates counterclockwise relative to the inner race 12, the shorter diagonal engages the races and one race will overrun the other race. However as soon as the outer race 14 rotates clockwise the sprags 20 will also rotate clockwise and due to the increasing diameter thereof will wedge between the two races 12 and 14 and cause one race to drive the other race.

It should be noted that as the initial sprag 20 rotates clockwise into this wedging position it will also move the cages 28 and 30 in circumferentially opposite directions and simultaneously force all of the sprags 20 to become wedged between the races 12 and 14. Thus whenever one sprag 20 starts to move into or out of wedging engagement it will cause the two cages 28 and 30 to move in circumferentially opposite directions. This cage movement simultaneously causes all of the other sprags 20 to move into or out of wedging engagement and carry their share of the load. In order to increase the speed of this engaging action, friction flanges 36 may be provided on the inner cage 28 and/or the outer cage 30 so as to frictionally engage the races 12 and 14 and bias the cages 28 and 30 in the same general direction as the rotation of the races.

It has been found that in clutches of this nature when the relative rotation of the races changes from the overrunning to the driving direction very rapidly, due to dimensional variations and other causes, initially only one of the sprags 20 will wedge between the races 12 and 14 and normally it will assume a considerable portion of its load before any of the other sprags begin to become loaded. When the load is very heavy, frequently this first sprag will not immediately wedge between the races, but instead, the ends will slide on the race surfaces 12 and 14 and tend to "hop" or "chatter" therealong before becoming wedged. Under the right set of circumstances this erratic motion may be very severe. In fact in some instances it has been so violent that the working surfaces 22A on the ends of the sprag 20A have come completely out of engagement with the races 12 and 14 and have become wedged between the diagonally opposite edges of the window 34 in the outer cage 30 and the registering window 32 in the inner cage 28. When this happens the cages 28 and 30 will be forced to rotate a considerable distance in circumferentially opposite directions. In fact this distance will be so great that it will cause the cages to force the remaining sprags 20 to be moved completely out of engagement with the races 12 and 14. As a result it will no longer be possible for the sprags 20 to wedge between the races and establish a driving relationship. Thus the clutch 10 will fail completely and allow the races 12 and 14 to overrun in both directions.

In order to prevent this phenomenon from occurring it is proposed to provide a radial projection 38 adjacent the circumferential edges of the windows 32 and 34 on the inner and/or outer cages 28 and 30 and thus make it impossible for the sprags 20 to become wedged therebetween. This projection 38 will decrease the normal diagonal of the space between the windows where the malfunctioning sprag would otherwise become wedged to considerably less than the over-all length of the sprag.

These projections 38 may be formed in any desired manner and located at one or more locations. However in the embodiment shown in Figures 1, 2 and 7 the projections 38 comprise shoulders 40 located on the radially outer surface of the inner cage 28 adjacent the edges of the windows 32 therethrough. In the present instance each of the shoulders 40 comprises a radial flange that projects radially outwardly from the cage adjacent the edges of the windows 32. The face of the flange and the edge of the window preferably form a smooth continuation that is free of any irregularities. Each shoulder 40 extends axially of the cage 28 so that it will not interfere with the angular movement of the sprags 20 into and out of wedging engagement with the races 12 and 14. A clearance space 42 may be provided in shoulder 40 for the spring means to extend therethrough and engage the sprags 20. If shoulder 40 is located along the trailing edge of the window 32 when the cage is moving in the driving direction and a sprag "hops" far enough off of the races 12 and 14 to tend to wedge between the cages 28 and 30, the ends 22 will strike the shoulder 40 adjacent the edge of the window 32. Since there is nothing for the end 22 of the sprag 20 to lodge against, after striking the shoulder 40 the end 22 of the sprag 20 will then drop back through the window 32 and into working engagement with the races 12 and 14. Thus it may be seen that the sprag 20 will never become wedged between the cages 28 and 30 without an excessively large amount of relative movement between the two cages. Normally in order to provide this excessive amount of relative movement between the two cages requires considerably more force than occurs in the clutch 10 and accordingly, it is virtually impossible for this condition to arise.

Since the exact location of the projections 38 is not critical they may be placed on the outer cage 30 as shown in Figure 4. This shoulder 44 is also a radial flange similar to that in the first embodiment. However, it projects radially inwardly from the inside of the outer cage 30 adjacent the trailing edges of the windows 34 when rotating in a driving direction. The face of the flange and the trailing edge of the window are preferably flush and free of any projections that might allow the ends 22 of the sprags 20 to seat thereon. Thus if the end of the sprag 20 strikes the shoulder 44 it will drop back through the window 34 and into engagement with the races 12 and 14.

In addition it should be noted that the projections 38 may be provided on both the outside of the inner cage 28 and the inside of the outer cage 30. These projections 38, as seen in Figures 4 and 8, may be shoulders 46 and may be located on the opposite edges of the windows 32 and 34 and constructed in the same general fashion as the previous shoulders 40 and 44. This will further reduce the space between the diagonal edges of the registering windows and the likelihood of a sprag 22A being wedged therebetween.

In addition to forming the projections 38 by means of a flange on the cage, the embodiment of Figure 5 may be employed. In this embodiment either the inner cage 28 and/or the outer cage 30 may be staked or pierced to form an extension 48 from the cages. This extension 48 is raised substantially the same amount as the previous shoulders in the other embodiments and preferably terminate flush with the edge of the windows to eliminate any irregularities that might allow the ends of the sprags to lodge thereagainst.

Various changes and modifications of the embodiments of the invention described herein may be made by those skilled in the art without departing from the spirit and principles of the invention.

I claim:

1. A one-way sprag clutch adapted to be disposed between an inner race and a relatively rotatable outer race, said races including substantially concentric cylindrical surfaces, said one-way clutch comprising a plurality of sprags adapted to permit said races to overrun in only one direction of relative rotation and to drive in the other direction, a relatively thin cylindrical cage disposed adjacent said inner race, a plurality of longitudinally extending windows formed in said cage and circumferentially spaced about said cylindrical cage to receive the sprags therethrough and to position the radially inner ends of said sprags in engagement with said inner race, a plurality of circumferentially spaced shoulders projecting from the outer surface of said cage, each of said shoulders extending transversely for substantially the full length of the window of said cage and at only one side of said window towards the overrunning direction of said cage and projecting radially outwardly therefrom, the other side of said window having a thickness substantially equal to that of the cage.

2. A one-way sprag clutch adapted to be disposed between a cylindrical inner race and a cylindrical outer race relatively rotatable thereto, said one-way clutch comprising a plurality of sprags adapted to wedge between said races and cause one race to drive the other race in only one direction of relative rotation and to overrun in the opposite direction, a relatively thin cage comprising a cylindrical member having a plurality of circumferentially spaced longitudinally extending windows formed therein receiving the radially outer ends of said sprags therethrough for engagement with said outer race, a plurality of circumferentially spaced radially inwardly projecting shoulders on the inside of said cage, each of said shoulders extending transversely for substantially the full length of the window of said cage and at only one side of each window towards the overrunning direction of said cage, the other side of the window having a thickness substantially equal to that of the cage.

3. A one-way clutch adapted to be disposed between a pair of relatively rotatable coaxial cylindrical races which provides overrunning of the races in one direction and a driving connection between the races in the other direction of relative rotation, said clutch including relatively thin inner and outer cages in radially spaced relation, said cages having correspondingly located circumferentially spaced windows formed therein, sprags between said races and having opposite ends thereon fitted within and projecting through said corresponding windows for engagement with said races, sprag engaging means tiltably urging the sprags towards race engagement, each cage having at only one side of its windows a radially projecting shoulder extending towards and spaced from the other cage, each of said shoulders extending transversely for substantially the full length of each window and towards the overrunning direction of the cage, the other side of the window having a thickness substantially equal to that of the cage, and the radially projecting shoulders on the inner and outer cages cooperatively limiting the extent of tilt of the sprags away from operative positions and preventing said sprags from wedging against the cages in non-operating positions.

References Cited in the file of this patent

UNITED STATES PATENTS

| | | |
|---|---|---|
| 1,068,116 | Eitner | July 22, 1913 |
| 2,409,236 | Banker | Oct. 15, 1946 |
| 2,630,896 | Dodge | Mar. 10, 1953 |
| 2,636,584 | Swenson | Apr. 28, 1953 |
| 2,724,472 | Swenson | Nov. 22, 1955 |
| 2,832,450 | Wade | Apr. 29, 1958 |

FOREIGN PATENTS

| | | |
|---|---|---|
| 1,095,050 | France | Dec. 15, 1954 |